United States Patent
Hafiz et al.

(10) Patent No.: US 12,162,369 B2
(45) Date of Patent: Dec. 10, 2024

(54) NETWORK CONSTRAINT ENERGY MANAGEMENT SYSTEM FOR ELECTRIC VEHICLE DEPOT CHARGING AND SCHEDULING

(71) Applicant: Hitachi Energy Ltd, Zürich (CH)

(72) Inventors: Faeza Hafiz, Raleigh, NC (US); Dmitry Ishchenko, Cary, NC (US)

(73) Assignee: HITACHI ENERGY LTD, Zürich (CH)

( * ) Notice: Subject to any disclaimer, the term of this patent is extended or adjusted under 35 U.S.C. 154(b) by 407 days.

(21) Appl. No.: 17/551,502

(22) Filed: Dec. 15, 2021

(65) Prior Publication Data
US 2023/0182605 A1    Jun. 15, 2023

(51) Int. Cl.
| | |
|---|---|
| *B60L 9/00* | (2019.01) |
| *B60L 53/63* | (2019.01) |
| *B60L 53/64* | (2019.01) |
| *B60L 53/65* | (2019.01) |

(52) U.S. Cl.
CPC ............... *B60L 53/64* (2019.02); *B60L 53/63* (2019.02); *B60L 53/65* (2019.02)

(58) Field of Classification Search
CPC ........... B60L 53/64; B60L 53/63; B60L 53/65
See application file for complete search history.

(56) References Cited

U.S. PATENT DOCUMENTS

| | | |
|---|---|---|
| 9,733,623 B2 | 8/2017 | Yang et al. |
| 2013/0257372 A1 | 10/2013 | Chen et al. |
| 2021/0046839 A1 | 2/2021 | Logvinov et al. |
| 2021/0155111 A1* | 5/2021 | Ni .......................... G06F 30/20 |
| 2022/0414799 A1* | 12/2022 | Itaya ..................... G06Q 10/04 |

* cited by examiner

*Primary Examiner* — Adam M Alharbi
(74) *Attorney, Agent, or Firm* — PROCOPIO, CORY, HARGREAVES & SAVITCH LLP

(57) ABSTRACT

Network constraint energy management system for electric vehicle (EV) depot charging and scheduling. In an embodiment, a power schedule is received from an economic dispatch application for a charging depot comprising EV charging station(s) and distributed energy resource(s). The power schedule may be simulated on a distribution network model of the charging depot, according to load flow analysis, to determine whether any grid-code violations occur. In response to the detection of violation(s), a constraint may be generated for each violating node, and the economic dispatch application may be re-executed with the constraint(s) to produce a new power schedule, until no violations are detected. When not all load demand can be satisfied by the power schedule, a charging schedule may be adjusted to ensure that critical energy requirements are satisfied. The final power and charging schedules may be used to schedule and control power generation and charging in the charging depot.

20 Claims, 4 Drawing Sheets

NETWORK CONSTRAINT ENERGY MANAGEMENT SYSTEM FOR ELECTRIC VEHICLE DEPOT CHARGING AND SCHEDULING

GOVERNMENT LICENSE RIGHTS

This invention was made with government support under Contract No. DOE-OE0000896 awarded by the U.S. Department of Energy. The government has certain rights in the invention.

BACKGROUND

Field of the Invention

The embodiments described herein are generally directed to energy management systems, and, more particularly, to an energy management system that utilizes network constraints for charging and power scheduling in an electric vehicle (EV) depot.

Description of the Related Art

There has been an increase in the deployment of EV charging stations as a result of increasing EV usage in an effort to reduce greenhouse emissions. An EV depot may comprise a distribution network comprising several EV charging stations, auxiliary loads, and distributed energy resources (DERs), such as energy storage. Each EV charging station comprises one or a plurality of chargers configured to deliver electricity to connected electric vehicles (e.g., buses, automobiles, utility trucks, etc.). The distribution network may be managed by an energy management system (EMS), which is generally configured to reduce the costs of electricity consumption.

The distribution network should maintain a certain level of voltage and current, in order to avoid violations that may impact, not only the connected loads, but also the stability of the grid to which the distribution network is connected. The likelihood of a violation increases when distributed energy resources (DERs) are integrated into the EV depot. When the distributed energy resources include renewable energy resources (e.g., a solar power generator, wind power generator, geothermal power generator, hydroelectric power generator, fuel cell, etc.), the EMS generally prefers to utilize maximum power generation from the renewable energy resources, since renewable energy resources have a lower unit cost.

However, as the usage of renewable energy resources increases, the probability of violations, such as over-voltage, in the distribution network also increases. In addition, as the EV load increases, the probability of violations, such as under-voltage, in the distribution network also increases. An EMS that attempts to minimize electrical costs in the distribution network, without considering the possibility of voltage or current violations in the distribution network, may result in penalties for violations and, potentially, the collapse of the distribution network.

SUMMARY

Accordingly, systems, methods, and non-transitory computer-readable media are disclosed for preventing violations in the distribution network of an EV depot. Embodiments may also shift loads to ensure that critical energy requirements are satisfied.

In an embodiment, a method comprises using at least one hardware processor to: for each of one or more iterations, receive a power schedule from an economic dispatch application for a charging depot comprising one or more distributed energy resources, wherein the power schedule specifies power to be output from the one or more distributed energy resources to service a charging schedule for loads in the charging depot, simulate the power schedule on a distribution network model of the charging depot to determine whether or not at least one node in the distribution network model produces a violation during the simulation, in response to a determination that at least one node in the distribution network model produces a violation during the simulation, generate a constraint for the at least one node in the distribution network model that is determined to produce a violation during the simulation, and initiate re-execution of the economic dispatch application, updated with the generated constraint, to produce a new power schedule for a next iteration, and when no nodes in the distribution network model are determined to produce a violation during the simulation, output the power schedule; and, based on the output power schedule, schedule power generation by the distributed energy resources and charging of loads in the charging depot. The power generation and charging of loads may be further based on the charging schedule. The violation may be a voltage violation (e.g., over-voltage or under-voltage) or a current violation (e.g., over-current or under-current).

The method may further comprise using the at least one hardware processor to: determine whether or not the output power schedule satisfies all loads in the charging schedule; in response to a determination that the output power schedule does not satisfy all loads in the charging schedule, adjust the charging schedule for one or more loads based on priorities assigned to the one or more loads, and initiate re-execution of the economic dispatch application with the adjusted charging schedule, followed by at least one additional iteration; and when the output power schedule is determined to satisfy all loads in the charging schedule, output the output power schedule as a final power schedule, wherein the scheduling of power generation by the distributed energy resources and charging of loads in the charging depot is based on the final power schedule. Modifying the charging schedule may comprise decreasing an amount by which at least one load, which has a lower priority than at least one other load, is charged. Modifying the charging schedule may comprise shifting a time at which at least one load is charged. Modifying the charging schedule for one or more loads based on priorities assigned to the one or more loads may comprise adjusting an amount of charging or a time of charging of each of the one or more loads to prioritize critical loads over non-critical loads.

The loads in the charging depot may comprise electric vehicles. The one or more distributed energy resources may comprise one or more of a photovoltaic power generator, a wind power generator, a fuel cell, a thermal power plant, a hydroelectric power plant, a gasoline-powered generator, or a battery.

Scheduling power generation by the distributed energy resources may comprise controlling at least one of the one or more distributed energy resources to output power during one or more scheduled time periods and not output power outside of the one or more scheduled time periods. Scheduling charging of loads in the charging depot may comprise controlling at least one charging station to output power to a connected load during one or more scheduled time periods and not output power outside of the one or more scheduled time periods.

At least one constraint for at least one node in the distribution network may define a voltage range within which a voltage of the at least one node must remain across all changes in power setpoints during the power schedule. A voltage violation may be a violation of a grid code that defines voltage requirements that the charging depot must satisfy.

The simulation may comprise a load flow analysis on the distribution network model. The power schedule may comprise setpoints for one or more nodes in the distribution network model, and the load flow analysis may be performed for each of the setpoints in the power schedule.

Any of the disclosed methods may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present embodiments, both as to their structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for preventing violations of the grid code in the distribution network of an EV depot, and optionally, ensuring that critical energy requirements are satisfied. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview
1.1. Infrastructure

Figure 1:
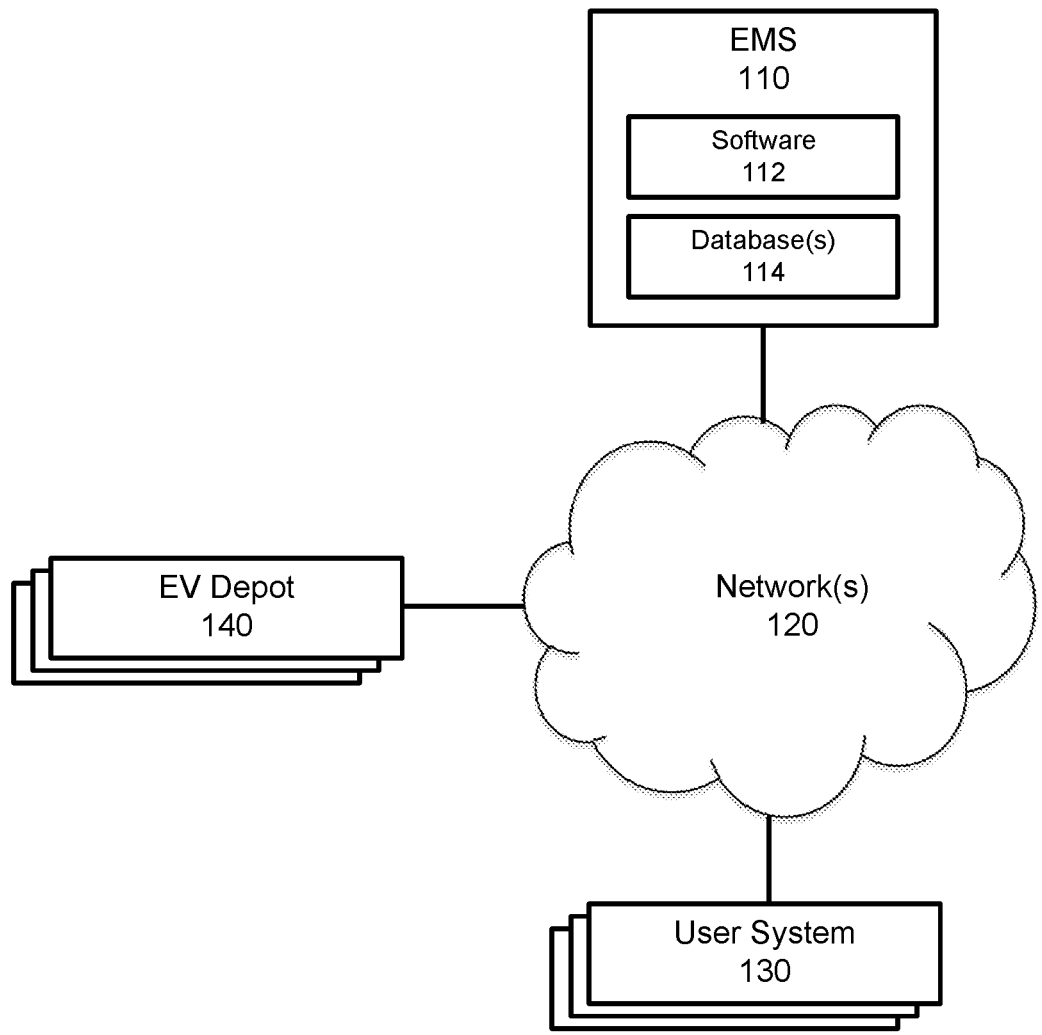
FIG. 1 illustrates an example infrastructure, in which one or more of the processes described herein, may be implemented, according to an embodiment.

FIG. 1 illustrates an example infrastructure in which one or more of the disclosed processes may be implemented, according to an embodiment. The infrastructure may comprise an energy management system (EMS) 110 (e.g., comprising one or more servers) which hosts and/or executes one or more of the various functions, processes, methods, and/or software modules described herein. EMS 110 may comprise dedicated servers, or may instead comprise cloud instances, which utilize shared resources of one or more servers. These servers or cloud instances may be collocated and/or geographically distributed. EMS 110 may also comprise or be communicatively connected to software 112 and/or one or more databases 114. In addition, EMS 110 may be communicatively connected to one or more user systems 130 and/or EV depots 140 via one or more networks 120.

Network(s) 120 may comprise the Internet, and EMS 110 may communicate with user system(s) 130 and/or EV depot(s) 140 through the Internet using standard transmission protocols, such as HyperText Transfer Protocol (HTTP), HTTP Secure (HTTPS), File Transfer Protocol (FTP), FTP Secure (FTPS), Secure Shell FTP (SFTP), eXtensible Messaging and Presence Protocol (XMPP), Open Field Message Bus (OpenFMB), IEEE Smart Energy Profile Application Protocol (IEEE 2030.5), and the like, as well as proprietary protocols. While EMS 110 is illustrated as being connected to various systems through a single set of network(s) 120, it should be understood that EMS 110 may be connected to the various systems via different sets of one or more networks. For example, platform 110 may be connected to a subset of user systems 130 and/or EV depots 140 via the Internet, but may be connected to one or more other user systems 130 and/or EV depots 140 via an intranet. Furthermore, while only a few user systems 130 and EV depots 140, one instance of software 112, and one set of database(s) 114 are illustrated, it should be understood that the infrastructure may comprise any number of user systems, EV depots, software instances, and databases.

User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, embedded controllers, programmable logic controllers (PLCs), and/or the like. However, it is generally contemplated that user system(s) 130 would comprise personal computers, mobile devices, or workstations by which agents of an operator of an EV depot 140 can interact with EMS 110. These interactions may comprise inputting data (e.g., parameters for configuring one or more of the processes described herein) and/or receiving data (e.g., the outputs of one or more processes described herein) via a graphical user interface provided by EMS 110 or a system between EMS 110 and user system(s) 130. The graphical user interface may comprise screens (e.g., webpages) that include a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases (e.g., database(s) 114).

EMS 110 may execute software 112, comprising one or more software modules that implement one or more of the disclosed processes. In addition, EMS 110 may comprise, be communicatively coupled with, or otherwise have access to one or more database(s) 114 that store the data input into and/or output from one or more of the disclosed processes. Any suitable database may be utilized, including without limitation MySQL™, Oracle™ IBM™, Microsoft SQL™, Access™, PostgreSQL™, and the like, including cloud-based databases, proprietary databases, and unstructured databases.

1.2. Example Processing Device

Figure 2:
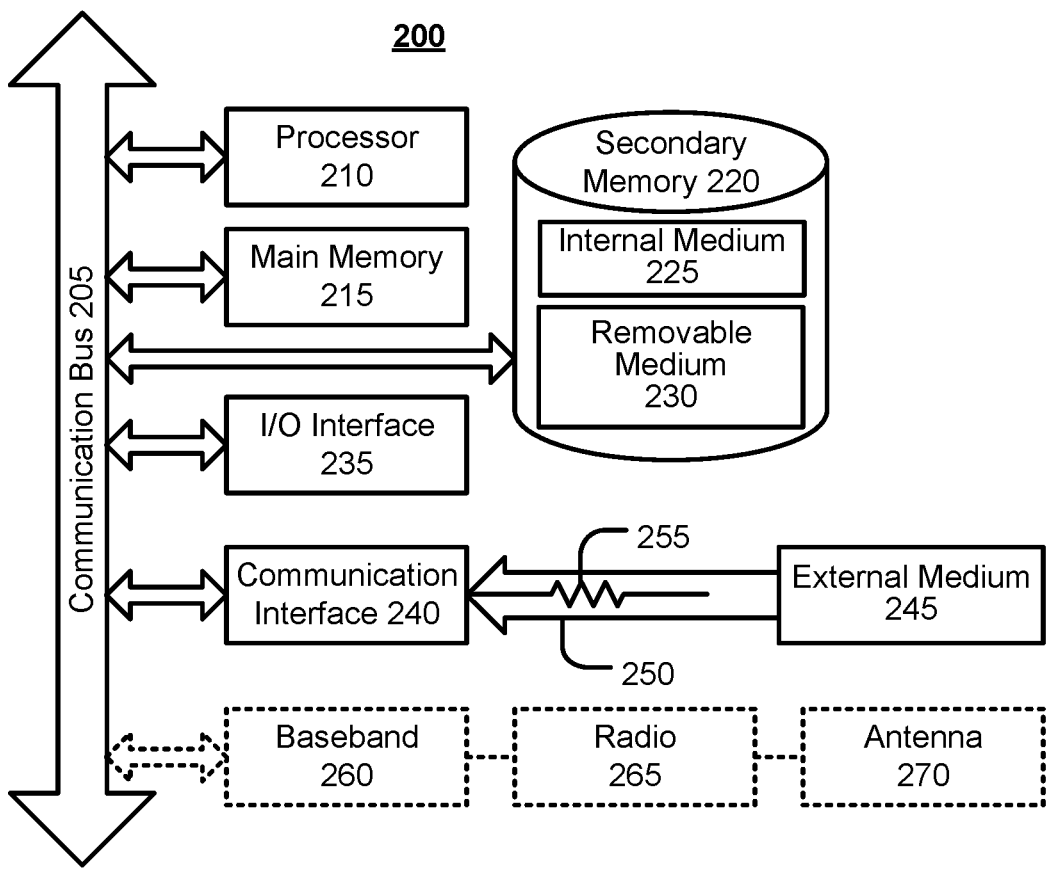
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods (e.g., to store and/or execute software 112) described herein, and may represent components of EMS 110, user system(s) 130, EV depot 140, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 200 preferably includes a main memory 215 and may also include a secondary memory 220. Main memory 215 provides storage of instructions and data for programs executing on processor 210, such as one or more of the functions and/or modules discussed herein (e.g., software 112). It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like. Secondary memory 220 is a non-transitory computer-readable medium having computer-executable code (e.g., software 112) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 200. Such means may include, for example, a communication interface 240, which allows software and data to be transferred from external storage medium 245 to system 200. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as software 112) is stored in main memory 215 and/or secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform one or more of the processes and functions described elsewhere herein.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 200 may also include optional wireless communication components that facilitate wireless communication over a voice network and/or a data network (e.g., in the case of user system 130 that is a smart phone or other mobile device). The wireless communication components comprise an antenna system 270, a radio system 265, and a baseband system 260. In system 200, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor(s) 210. Processor(s) 210 may have access to data storage areas 215 and 220. Processor(s) 210 are preferably configured to execute instructions (i.e., computer programs, such as the disclosed software) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments.

1.3. Example EV Depot

Figure 3:
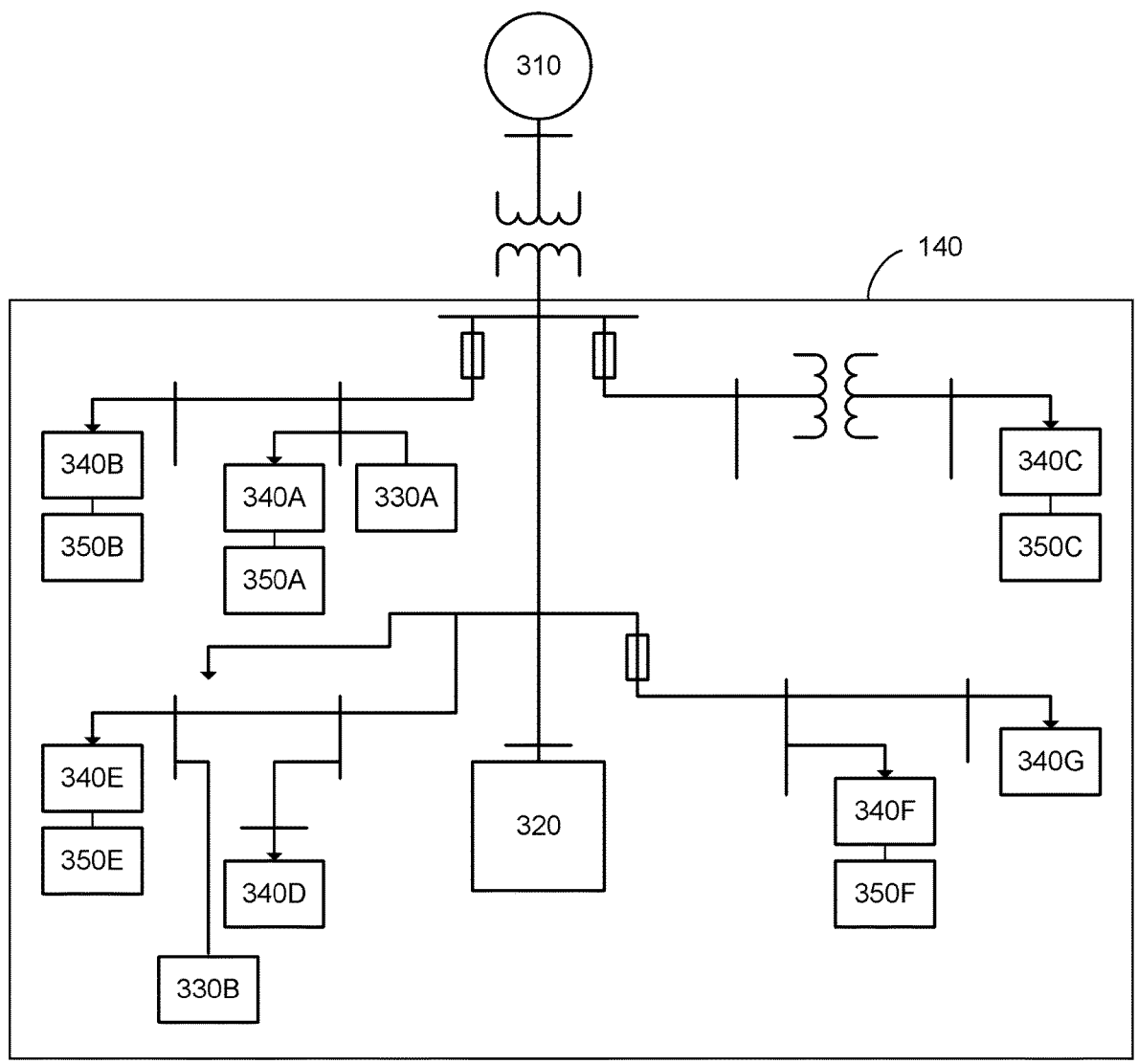
FIG. 3 illustrates an example distribution network of an EV depot, according to an embodiment.

FIG. 3 illustrates a one-line diagram of an example distribution network of an example EV depot 140, according to an embodiment. EV depot 140 is connected to a power grid 310, from which electricity may be purchased. The purchase cost of electricity may vary throughout each day (e.g., higher during the day than at night) and across days (e.g., higher on summer days than winter days), according to a time-of-use (ToU) rate. The ToU rate may assign peak rates, partial-peak rates, and off-peak rates to various time periods (e.g., each hourly interval in a day), representing the cost of electricity during those time periods.

In addition, EV depot 140 comprises one or a plurality of distributed energy resources, including, for example, one or a plurality of battery energy storage (BES) systems 320 and/or one or a plurality of power generators 330, illustrated as power generators 330A and 330B. Power generator(s) 330 may comprise renewable energy resources (e.g., solar power generator, wind power generator, geothermal power generator, hydroelectric power generator, fuel cell, etc.) and/or non-renewable energy resources (e.g., diesel generator, natural gas generator, etc.). For example, power generator 330A may be a solar power generator comprising a plurality of photovoltaic cells that convert sunlight into electricity, and power generator 330B may be a diesel generator that burns diesel gasoline to produce electricity.

EV depot also comprises one or a plurality of EV charging stations 340, illustrated as EV charging stations 340A, 340B, 340C, 340D, 340E, 340F, and 340G. It should be understood that each EV charging station 340 may be connected to an electric vehicle 350, representing a load and illustrated as electric vehicles 350A, 350B, 350C, 350E, and 350F. Each EV charging station 340 is configured to be electrically connected to an electric vehicle 350, so as to supply electricity to one or more batteries of the electric vehicle 350. At any given time, some EV charging stations 340 may be connected to an electric vehicle 350 (e.g., 340A to 350A, 340B to 350B, 340E to 350E, and 340F to 350F), whereas other EV charging stations 340 (e.g., 340D and 340G) may be unconnected to an electric vehicle 350. One or more EV charging stations 340 may be configured to switch the power supply, to a connected electric vehicle 350, on or off under the control of EMS 110 or another controller. For example, an EV charging station 340 may comprise a processing system 200 that receives commands from a controller (e.g., EMS 110) via communication interface 240, processes the commands using processor 210 and main memory 215, and controls an actuator (e.g., one or more switches) to switch the power supply on or off according to the processed commands. It should be understood that the distribution network of EV depot 140 may also comprise types of loads, other than electric vehicles 350, such as auxiliary loads for operating various functions of EV depot 140. It should also be understood that each BES system 320 can function as both a power source (i.e., when discharging) and a load (i.e., when charging).

2. Process Overview

Embodiments of processes for preventing violations in the distribution network of an EV depot, and optionally ensuring that critical energy requirements are satisfied, will now be described in detail. It should be understood that the described processes may be embodied in one or more software modules that are executed by one or more hardware processors (e.g., processor 210), for example, as software 112 executed by processor(s) of EMS 110. The described processes may be implemented as instructions represented in source code, object code, and/or machine code. These instructions may be executed directly by hardware processor(s) 210, or alternatively, may be executed by a virtual machine or container operating between the object code and hardware processors 210. In addition, the disclosed software may be built upon or interfaced with one or more existing systems.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Figure 4:
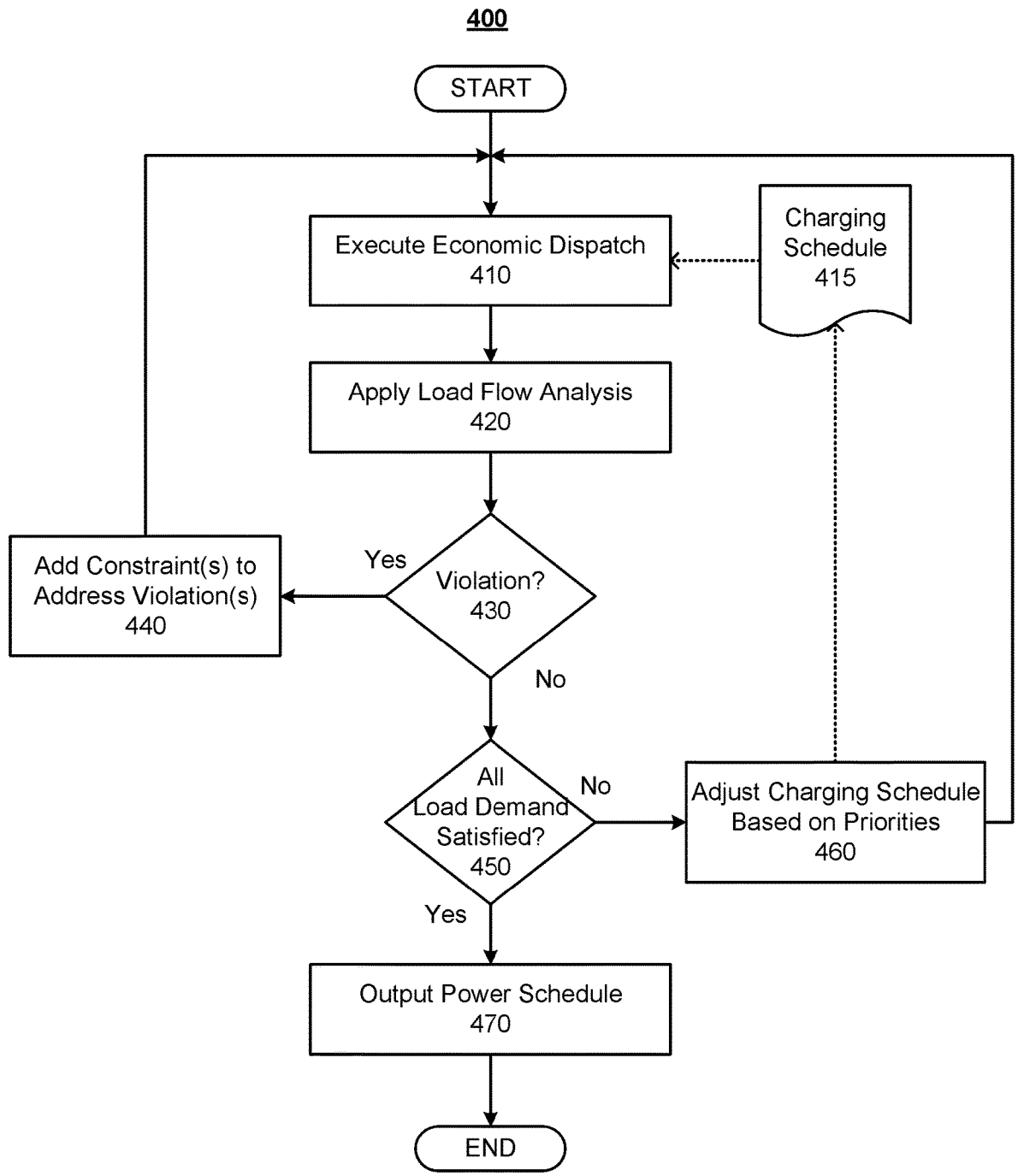
FIG. 4 illustrates a process for preventing violations in a distribution network of an EV depot while ensuring that critical energy requirements are satisfied, according to an embodiment.

FIG. 4 illustrates a process 400 for preventing violations in a distribution network of an EV depot, and optionally, ensuring that critical energy requirements are satisfied, according to an embodiment. Process 400 may be implemented as software 112, executed by one or more processors 210 of EMS 110. While process 400 is illustrated with a certain arrangement and ordering of subprocesses, process 400 may be implemented with fewer, more, or different subprocesses and a different arrangement and/or ordering of subprocesses. For example, in an alternative embodiment which does not ensure that critical energy requirements are satisfied, process 400 may consist only of subprocesses 410-440 and 470 (e.g., with subprocess 470 proceeding directly from the "No" prong of subprocess 430). In addition, any subprocess, which does not depend on the completion of another subprocess, may be executed before, after, or in parallel with that other independent subprocess, even if the subprocesses are described or illustrated in a particular order.

Process 400 may be performed for each of a plurality of time periods, on a continual basis according to a rolling time window, to produce a power schedule and charging schedule for each time period. The size of the time window may consist of any duration that is appropriate for the particular design goals, such as five minutes, fifteen minutes, half an hour, one hour, twelve hours, twenty-four hours, one week, or the like. It should be understood that each time period may be a future time period. In this case, process 400 could be performed immediately before a time period, such that there is little to no time between process 400 outputting a final power schedule for the time period and the start of that time period, or well before the time period (e.g., an hour, day, week, etc., before the start of the time period).

In subprocess 410, an economic dispatch is executed for the particular time period under consideration. The economic dispatch may be implemented as a software application that is integrated into the software implementing the other subprocesses of process 400. Alternatively, the economic dispatch may be implemented as a software application that is separate from the software implementing one or more other subprocess of process 400 and provides its output (e.g., to subprocess 420) via an application programming interface (API). For example, the output of subprocess 410 may be pushed through an API of the software implementing subprocess 420, or alternatively, may be pulled through an API of the economic dispatch application by the software implementing subprocess 420.

Economic dispatch refers to the allocation of electricity demand from loads (e.g., 350) to distributed energy resources (e.g., BES systems 320 and/or power generators 330), in order to achieve the most economical usage of electricity. Typically, an economic dispatch is formulated as an optimization problem in which the objective is to minimize the purchase cost of electricity from grid 310. The basic idea is to prioritize the use of distributed energy resources with lower marginal costs over the use of distributed energy resources with higher marginal costs and grid 310. Conventionally, an economic dispatch does not consider network constraints.

In an embodiment, the economic dispatch is performed for the particular time period under consideration based on a charging schedule 415 that covers at least the particular time period under consideration. Charging schedule 415 may comprise, for each of one or a plurality of electric vehicles 350 to be charged within at least the particular time period under consideration, a time at which charging of the electric vehicle 350 is scheduled to begin, a duration over which the electric vehicle 350 is scheduled to be charged, an amount of charge to be supplied to the electric vehicle 350 and/or a charge level to which the electric vehicle 350 is to be charged (e.g., to have sufficient charge to complete a scheduled route), a time by which the electric vehicle 350 must be charged (e.g., to complete the route as scheduled), and/or the like. Charging schedule 415 may be updated periodically (e.g., every fifteen minutes) to reflect the current or expected status of each electric vehicle 350. It should be understood that charging schedule 415 may comprise a schedule for more than one time period to be considered (e.g., all future time periods for which EV charging has been scheduled), as long as it includes the schedule for the particular time period under consideration.

The economic dispatch may generate a power schedule that specifies the power to be output from each of the distributed energy resource(s) (e.g., BES systems 310 and/or power generators 330) in EV depot 140 during the particular time period under consideration, in order to satisfy the loads required by electric vehicles 350 in charging schedule 415 for the particular time period under consideration, while minimizing the cost of electricity during the particular time period under consideration. The power schedule comprises, for each distributed energy resource to be used during the particular time period under consideration, an identity of the distributed energy resource, a time span during which the distributed energy resource is scheduled to output power (e.g., discharged from a BES system 320 or generated by a power generator 330), an amount of power to be output by the distributed energy resource, and/or the like. During execution, the economic dispatch may consider equality constraints (e.g., power balance, state of charge balance of electric vehicles, etc.) and inequality constraints (e.g., maintaining loads at a certain value at the point of common coupling, maintaining threshold levels of the state of charge of electric vehicles 350, preconditioning EV loads, availability of electric vehicles 350, etc.). Conventionally, the economic dispatch does not consider network constraints, such as voltage and/or current, at a node within the distribution network of EV depot 140. It should be understood that a node within the distribution network may be a point of common coupling, for example, with grid 310, BES system(s) 320, power generator(s) 330, charging station(s) 340, and/or the like.

In subprocess 420, a load flow analysis is performed on the power schedule that is output by the economic dispatch executed in subprocess 410, to identify any violations (e.g., voltage violations, such as an over-voltage or under-voltage, current violations, etc.). The distribution network of EV depot 140 may be modeled by a distribution network model that represents each node in the distribution network. The load flow analysis may simulate the power schedule on the distribution network model to determine whether any nodes in the distribution network produce a violation during the simulation. In particular, load flow analysis determines the operating steady state of each node in the distribution network for a given loading in the power schedule. The steady state of each node may be represented as a set of parameters, such as voltage, phase angle, real power, reactive power, and/or the like. Load flow analysis may solve for one or more of these parameters (e.g., voltage and phase angle) at each node in the distribution network, as represented in the distribution network model, using a set of simultaneous algebraic power equations for the nodes in the distribution network, based on the real power and reactive power setpoints.

In subprocess 430, process 400 determines whether or not the load flow analysis, applied in subprocess 420, has detected any violations. For example, an over-voltage violation may occur when the voltage in the steady state of a node exceeds a predefined threshold. Similarly, an under-voltage violation may occur when the voltage in the steady state of a node is less than a predefined threshold. Violations of other parameters, such as current, may be detected in a similar manner (e.g., using predefined thresholds). These predefined threshold(s) may be defined by a grid code, such as the IEEE 1547 standard for interconnection and interoperability of distributed energy resources with associated electric power systems. The IEEE 1547 defines an operating region for continuous voltage operation for its Abnormal Operating Performance Category III as having a lower bound of 0.88 per unit and an upper bound of 1.1 per unit. Thus, if IEEE 1547 is used for the grid code, a voltage above 1.1 per unit at a node would be determined as an over-voltage violation, and a voltage below 0.88 per unit at a node would be determined as an under-voltage violation. If any violation is detected (i.e., "Yes" in subprocess 430), process 400 proceeds to subprocess 440. Otherwise, if no violations are detected (i.e., "No" in subprocess 430), process 400 proceeds to subprocess 450.

In subprocess 440, a constraint is generated for each of the violations, detected by the load flow analysis in subprocess 420, to be added to a new execution of the economic dispatch in subprocess 410. In particular, each constraint may be formulated using sensitivity analysis of the control variables (e.g., real power and reactive power setpoints) for the node at which the respective violation was detected. Sensitivity analysis considers the sensitivity factor $S_u^{P_i}$ in a parameter, such as voltage or current, to a change $\Delta u$ in real and reactive power setpoints of distributed energy resource (s) at a violating node i. $S_u^{P_i}$ for a violating node i may be calculated through load flow analysis. If the voltage at a violating node i, in a solution to the economic dispatch, is denoted as $P_i^{ini}$, then the constraint for the violating node i may be expressed as:

$$P_i^{min} \leq P_i^{ini} + \sum_{u=1}^{n}\left(S_u^{P_i} * \Delta u\right) \leq P_i^{max}$$

wherein $P_i^{min}$ is the minimum permissible value of the parameter P (e.g., voltage or current, as defined by the grid code) at the violating node i, $P_i^{max}$ is the maximum permissible value of the parameter P (e.g., voltage or current, as defined by the grid code) at the violating node i, and n is the number of setpoint changes. Such a constraint may be generated for one or more, including potentially all, of the nodes for which violations (e.g., voltage violations, such as an over-voltage or under-voltage, current violations, such as over-current or under-current, etc.) were detected.

Once constraint(s) are generated in subprocess 440 for all of the violations detected by the load flow analysis in subprocess 420, the generated constraint(s) are added to the economic dispatch, and the economic dispatch is executed again in another iteration of subprocess 410 while constrained by the generated constraint(s). For example, if a constraint is added that prevents the voltage at a particular node i from exceeding $P_i^{max}$ so as to avoid a detected over-voltage violation, the economic dispatch must produce a solution (i.e., a power schedule) in which the voltage at node i does not exceed $P_i^{max}$. Similarly, if a constraint is added that prevents the voltage at a particular node i from being less than $P_i^{min}$ so as to avoid a detected under-voltage violation, the economic dispatch must produce a solution (i.e., a power schedule) in which the voltage at node i is not less than $P_i^{min}$ Similarly, if a constraint is added that prevents the current at a particular node i from exceeding $P_i^{max}$ so as to avoid a detected over-current violation, the economic dispatch must produce a solution (i.e., a power schedule) in which the current at node i does not exceed $P_i^{max}$. Similarly, if a constraint is added that prevents the current at a particular node i from being less than $P_i^{min}$ so as to avoid a detected under-current violation, the economic dispatch must produce a solution (i.e., a power schedule) in which the current at node i is not less than $P_i^{min}$.

The constraints, generated in subprocess 440, may be accumulated over each iteration of subprocess 440, such that each iteration of the economic dispatch in subprocess 410 is constrained by all of the constraints generated by all prior iterations and the current iteration of subprocess 440 for the current time period under consideration. It should be understood that an instance of process 400 may include one or any other non-zero number of iterations of subprocesses 410-430, and zero, one, or any other number of iterations of subprocess 440.

In subprocess 450, once a power schedule has been output by the economic dispatch executed in subprocess 410 for which no violations are detected in the load flow analysis of subprocess 420, process 400 determines whether the power schedule satisfies all load demand (e.g., an electric vehicle 350 connected to a charging station 340) in charging schedule 415. Stated another way, process 400 determines whether any loads had to be reduced or shed in order to avoid detected violation(s). A load demand is satisfied if the power generation in the power schedule is sufficient to supply all of the power required by that load during the current time period under consideration. Conversely, a load demand is not satisfied if the power generation in the power schedule is not sufficient to supply all of the power required by that load during the current time period under consideration. In the case of an electric vehicle 350, the load demand of the electric vehicle 350 is satisfied if the power generation is sufficient to charge the electric vehicle 350 to the required level of charge (e.g., the level of charge required for the electric vehicle 350 to complete a scheduled route). It should be understood that the required level of charge for an electric vehicle 350 may be, but does not have to be, a full capacity of the electric vehicle's battery. If the power schedule does not satisfy all of the load demand (i.e., "No" in subprocess 450), process 400 proceeds to subprocess 460. Otherwise, if the power schedule satisfies all of the load demand (i.e., "Yes" in subprocess 450), process 400 proceeds to subprocess 470.

In subprocess 460, charging schedule 415 may be adjusted based on priorities assigned to the loads. For example, each electric vehicle 350 may be assigned a priority indicating the criticality of the electric vehicle 350 and/or a flexibility in the schedule of the electric vehicle 350, with more critical/flexible electric vehicles 350 assigned higher priorities than less critical/flexible electric vehicles 350. The priorities may be implemented in any manner (e.g., as weights to be used in modeling) and according to any scale that provides a suitable resolution for differentiating electric vehicles 350 (e.g., binary with critical and non-critical classes, numerically on a scale from one to five or one to ten, etc.). The priority of a given electric vehicle 350 may be manually or automatically determined, based on various factors, including the electric vehicle's purpose (e.g., emergency vehicles may be prioritized over non-emergency vehicles), route (e.g., electric vehicles 350 with more important or longer routes may be prioritized over electric vehicles 350 with less important or shorter routes), schedule (e.g., an electric vehicle 350 which must leave EV depot 140 sooner or which has a less flexible schedule may be prioritized over an electric vehicle 350 which can leave EV depot 140 later or which has a more flexible schedule), charge level (e.g., an electric vehicle 350 with a lower charge level can be prioritized over an electric vehicle 350 with a higher charge level), and/or the like. In any case, the amount of available power, produced according to the power schedule, that is provided to a more critical electric vehicle 350 may be increased at the expense of the amount of available power that is provided to a less critical electric vehicle 350, such that the more critical electric vehicle 350 receives an amount of power that satisfies its load demand or a greater proportion of its load demand, while the less critical electric vehicle 350 receives no power or an amount of power that satisfies a lesser proportion of its load demand. Thus, it should be understood that adjustments to charging schedule 415 may comprise decreasing the amount of charging for less critical loads. Additionally or alternatively, adjustments to charging schedule 415 may comprise shifting the charging time for a load from a first time to a second time that is earlier or later than the first time. The second time to which the load's charging time is shifted may be within the particular time period under consideration or may be outside the particular time period under consideration (e.g., within a prior or subsequent time period, represented in charging schedule 415, but outside the current range of the rolling time window).

Once charging schedule 415 has been adjusted in subprocess 460, the economic dispatch is executed again in another iteration of subprocess 410 with the adjusted charging schedule 415. It should be understood that this execution of the economic dispatch may be constrained by any constraints that were previously generated in any iterations of subprocess 440 for the particular time period under consideration. It should also be understood that the adjusted charging schedule 415 may result in additional violations, detected in subprocesses 420 and 430, to be addressed in additional iteration(s) of subprocess 440.

In subprocess 470, once a power schedule has been produced by the economic dispatch in subprocess 410, does not produce any violations detected by the load flow analysis in subprocess 420, and satisfies all loads in subprocess 450, the power schedule is output as a final power schedule to be used for scheduling power output by distributed energy resources (e.g., BEM system(s) 320, power generators 330, etc.) in EV depot 140 during the particular time period under consideration. In addition, charging schedule 415 may be used to schedule the various loads (e.g., electric vehicles 350) within the particular time period under consideration.

The final power schedule, output in subprocess 470, may be used to inform control decisions during the particular time period that was considered during the iteration of process 400. It should be understood that another iteration of process 400 may be executed for the next time period encompassed by the rolling time window to produce a final power schedule for that time period, and so on and so forth.

In an embodiment, this final power schedule is used by EMS 110 or another system to generate control commands for one or more BES systems 320, power generators 330, charging stations 340, and/or other electrical components of EV depot 140. In particular, EMS 110 may generate a control command and send the control command, via network(s) 120, to the relevant electric component in EV depot 140, which may then execute the received control command. For example, EMS 110 may send a control command to a distributed energy resource (e.g., BES system 320, power generator 330, etc.) to thereby control the distributed energy resource to generate and/or output power during one or more scheduled time periods and not output power outside of the one or more scheduled time periods. As another example, EMS 110 may send a control command to a charging station 340 to thereby control the charging station 340 to output power to a connected electric vehicle 350 during one or more scheduled time periods and not output power outside of the one or more scheduled time periods.

3. Example Use Case

Example use cases of process 400 will now be described for purposes of illustration and not limitation. In the examples, EV depot 140 comprises a bus depot for charging electric buses, as electric vehicles 350, in a fleet of a municipal mass transit system. The real and reactive power setpoints of distributed energy resources (e.g., BES system (s) 320, power generator(s) 330, etc.) and charging stations 340 may be scheduled at one hour intervals (e.g., process 400 may be performed iteratively for time periods within a rolling one-hour time window). It is assumed that power generator(s) 330 comprise a photovoltaic power generator. Each electric bus has a route that it must service according to a route schedule. Thus, each electric bus must be charged to at least a sufficient level of charge to complete its scheduled route and must leave EV depot 140 by a certain time in order to comply with the route schedule.

In a first use case, it is assumed that there is no relevant limit on the amount of power that may be purchased from grid 310. The economic dispatch in the first iteration of subprocess 410 will maximize power generation by the photovoltaic power generator, to minimize the amount of electricity that must be purchased from grid 310. As a result, the electricity purchase costs would generally become low (e.g., potentially negative if the operator of grid 310 purchases surplus electricity from EV depot 140) during the daytime (e.g., afternoon) when sunlight and electricity purchase costs are at their maximums. However, if the power schedule, output by the economic dispatch after the first iteration of subprocess 410, were to be used, EV depot 140 may violate the relevant grid code (e.g., by virtue of an over-voltage or under-voltage condition). Thus, the power schedule may be altered by one or more iterations of the loop formed by subprocesses 420-430-440-410, which constrain the economic dispatch until no violations are detected by the load flow analysis in subprocess 420. As a result, the overall electricity purchase costs for the altered power schedule may increase, especially during the hourly intervals when sunlight and electricity purchase costs are at their maximums, due to a reduction in the utilization of the photovoltaic power generator in order to avoid violations. However, although more costly in the short term, the altered power schedule represents an improvement over the original power schedule since it avoids violations, which may be more costly in the long term. It should be understood that similar situations, arising with other types of distributed energy resources or as a result of increases in EV loads, can be similarly addressed by process 400.

In a second use case, the amount of power that is available for purchase from grid 310 may be reduced. This may result from a demand response by the operator of grid 310, a fault in grid 310, islanding, a violation of the grid code, a cyber-attack, a natural disaster, peak load shaving, and/or the like. In such situations, the operator will prefer to minimize the overall load on grid 310. In these cases, EV depot 140 must cooperate with grid 310 by reducing its electricity consumption at the point of common coupling with grid 310. This reduction in electricity consumption may mean that all loads cannot be satisfied by a power schedule (i.e., "No" in subprocess 450). Thus, charging schedule 415, and thereby the power schedule, may be altered by one or more iterations of subprocesses 460-410-420-430-450 (potentially with one or more iterations of the inner loop formed by subprocesses 410-420-430-440). The altered charging and power schedules may result in higher electricity purchase costs and/or some electric buses (e.g., non-critical buses) being only partially charged before leaving EV depot 140 or not being charged at all. As discussed elsewhere herein, each electric bus may be ranked according to a priority representing criticality of the electric bus and/or flexibility in the electric bus's schedule. This ranking may be performed manually (e.g., by an operator of EV depot 140) or automatically.

Regardless of the particular scenario, disclosed embodiments utilize load flow analysis (e.g., subprocess 420) to detect violations of a grid code in the power generation schedule output by an economic dispatch (e.g., subprocess 410), and integrates constraints for those violations into the economic dispatch to produce a power generation schedule that does not violate the grid code. In addition, disclosed embodiments may utilize priorities, assigned to electric vehicles 350, to shift loads in order to ensure that critical loads are satisfied without violating the grid code and that all electric vehicles 350 leave EV depot 140 with at least a target state of charge (e.g., required to satisfy a scheduled route). Accordingly, the disclosed embodiments improve overall performance of the distribution network in EV depot 140, while maximizing economic benefits to the operator of EV depot 140.

While the disclosed embodiments have primarily been described with respect to controlling power generation and charging in an EV depot 140, the disclosed embodiments may be applied to other uses as well. For example, the same methodology could be used for planning studies and customer demonstrations. In addition, the same methodology could be used by utility companies to manage circuit segments of a medium voltage distribution system.

Furthermore, it should be understood that the disclosed embodiments may be applied to a system of two or more EV depots 140. In particular, a single EMS 110 may manage the power and charging schedules for a plurality of EV depots 140. In this case, power schedule may encompass power generation in the distributed energy resources across the plurality of EV depots 140, and charging schedule 415 may encompass EV charging at charging stations 340 across the plurality of EV depots 140. Furthermore, in cases in which electric vehicles 350 may be easily charged at two or more different EV depots 140, loads may be shifted (e.g., in subprocess 460) between EV depots 140 (e.g., from a first EV depot 140 to a second EV depot 140) to avoid load mitigations. Similarly, power generation may be shifted by the economic dispatch (e.g., in subprocess 410) between EV depots 140 (e.g., from a first EV depot 140 to a second EV depot 140) to avoid violations and to accommodate adjustments (e.g., in subprocess 460) to charging schedule 415.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:
   for each of one or more iterations,
      receive a power schedule from an economic dispatch application for a charging depot comprising one or more distributed energy resources, wherein the power schedule specifies power to be output from the one or more distributed energy resources to service a charging schedule for loads in the charging depot,
      simulate the power schedule on a distribution network model of the charging depot to determine whether or not at least one node in the distribution network model produces a violation during the simulation,
      in response to a determination that at least one node in the distribution network model produces a violation during the simulation,
         generate a constraint for the at least one node in the distribution network model that is determined to produce a violation during the simulation, and
         initiate re-execution of the economic dispatch application, updated with the generated constraint, to produce a new power schedule for a next iteration, and
      when no nodes in the distribution network model are determined to produce a violation during the simulation, output the power schedule; and,
   based on the output power schedule, schedule power generation by the distributed energy resources and charging of loads in the charging depot.

2. The method of claim 1, further comprising using the at least one hardware processor to:
   determine whether or not the output power schedule satisfies all loads in the charging schedule;
   in response to a determination that the output power schedule does not satisfy all loads in the charging schedule,
      adjust the charging schedule for one or more loads based on priorities assigned to the one or more loads, and
      initiate re-execution of the economic dispatch application with the adjusted charging schedule, followed by at least one additional iteration; and
   when the output power schedule is determined to satisfy all loads in the charging schedule, output the output power schedule as a final power schedule, wherein the scheduling of power generation by the distributed energy resources and charging of loads in the charging depot is based on the final power schedule.

3. The method of claim 2, wherein modifying the charging schedule comprises decreasing an amount by which at least one load, which has a lower priority than at least one other load, is charged.

4. The method of claim 2, wherein modifying the charging schedule comprises shifting a time at which at least one load is charged.

5. The method of claim 2, wherein modifying the charging schedule for one or more loads based on priorities assigned to the one or more loads comprises adjusting an amount of charging or a time of charging of each of the one or more loads to prioritize critical loads over non-critical loads.

6. The method of claim 1, wherein the loads in the charging depot comprise electric vehicles.

7. The method of claim 1, wherein the one or more distributed energy resources comprise one or more of a photovoltaic power generator, a wind power generator, a fuel cell, a thermal power plant, a hydroelectric power plant, a gasoline-powered generator, or a battery.

8. The method of claim 1, wherein scheduling power generation by the distributed energy resources comprises controlling at least one of the one or more distributed energy resources to output power during one or more scheduled time periods and not output power outside of the one or more scheduled time periods.

9. The method of claim 1, wherein scheduling charging of loads in the charging depot comprises controlling at least one charging station to output power to a connected load during one or more scheduled time periods and not output power outside of the one or more scheduled time periods.

10. The method of claim 1, wherein at least one constraint for at least one node in the distribution network model defines a voltage range within which a voltage of the at least one node must remain across all changes in power setpoints during the power schedule.

11. The method of claim 1, wherein a violation is a violation of a grid code that defines requirements that the charging depot must satisfy.

12. The method of claim 1, wherein the simulation comprises load flow analysis on the distribution network model.

13. The method of claim 12, wherein the power schedule comprises setpoints for one or more nodes in the distribution network model, and the load flow analysis is performed for each of the setpoints in the power schedule.

14. The method of claim 1, wherein the power generation and charging of loads is further based on the charging schedule.

15. The method of claim 1, wherein the violation comprises a voltage violation or a current violation.

16. An energy management system comprising:
   at least one hardware processor; and
   software configured to, when executed by the at least one hardware processor,
      for each of one or more iterations,
         receive a power schedule from an economic dispatch application for a charging depot comprising one or more distributed energy resources, wherein the power schedule specifies power to be output from the one or more distributed energy resources to service a charging schedule for loads in the charging depot,
         simulate the power schedule on a distribution network model of the charging depot to determine whether or not at least one node in the distribution network model produces a violation during the simulation,
         in response to a determination that at least one node in the distribution network model produces a violation during the simulation,
            generate a constraint for the at least one node in the distribution network model that is determined to produce a violation during the simulation, and initiate re-execution of the economic dispatch application, updated with the generated constraint, to produce a new power schedule for a next iteration, and when no nodes in the distribution network model are determined to produce a violation during the simulation, output the power schedule, and, based on the output power schedule, schedule power generation by the distributed energy resources and charging of loads in the charging depot.

17. The energy management system of claim 16, wherein the software is further configured to, when executed by the at least one hardware processor:

determine whether or not the output power schedule satisfies all loads in the charging schedule;

in response to a determination that the output power schedule does not satisfy all loads in the charging schedule, adjust the charging schedule for one or more loads based on priorities assigned to the one or more loads, and initiate re-execution of the economic dispatch application with the adjusted charging schedule, followed by at least one additional iteration; and when the output power schedule is determined to satisfy all loads in the charging schedule, output the output power schedule as a final power schedule, wherein the scheduling of power generation by the distributed energy resources and charging of loads in the charging depot is based on the final power schedule.

18. The energy management system of claim 16, wherein the loads in the charging depot comprise electric vehicles, and wherein the one or more distributed energy resources comprise one or more of a photovoltaic power generator, a wind power generator, a fuel cell, a thermal power plant, a hydroelectric power plant, a gasoline-powered generator, or a battery.

19. The energy management system of claim 16, wherein scheduling power generation by the distributed energy resources comprises controlling at least one of the one or more distributed energy resources to output power during one or more scheduled time periods and not output power outside of the one or more scheduled time periods; and scheduling charging of loads in the charging depot comprises controlling at least one charging station to output power to a connected load during one or more scheduled time periods and not output power outside of the one or more scheduled time periods.

20. A non-transitory computer-readable medium having instructions stored thereon, wherein the instructions, when executed by a processor, cause the processor to:

for each of one or more iterations, receive a power schedule from an economic dispatch application for a charging depot comprising one or more distributed energy resources, wherein the power schedule specifies power to be output from the one or more distributed energy resources to service a charging schedule for loads in the charging depot, simulate the power schedule on a distribution network model of the charging depot to determine whether or not at least one node in the distribution network model produces a violation during the simulation, in response to a determination that at least one node in the distribution network model produces a violation during the simulation, generate a constraint for the at least one node in the distribution network model that is determined to produce a violation during the simulation, and initiate re-execution of the economic dispatch application, updated with the generated constraint, to produce a new power schedule for a next iteration, and when no nodes in the distribution network model are determined to produce a violation during the simulation, output the power schedule; and, based on the output power schedule, schedule power generation by the distributed energy resources and charging of loads in the charging depot.

\* \* \* \* \*